(12) United States Patent
Hirota et al.

(10) Patent No.: US 8,502,114 B2
(45) Date of Patent: Aug. 6, 2013

(54) AC PULSE ARC WELDING METHOD

(75) Inventors: Yukinori Hirota, Hyogo (JP); Hiroki Yuzawa, Osaka (JP); Masaru Kowa, Osaka (JP); Hideki Ihara, Osaka (JP)

(73) Assignee: Panasonic Corporation, Osaka (JP)

( * ) Notice: Subject to any disclaimer, the term of this patent is extended or adjusted under 35 U.S.C. 154(b) by 104 days.

(21) Appl. No.: 12/936,973

(22) PCT Filed: Nov. 24, 2009

(86) PCT No.: PCT/JP2009/006300
§ 371 (c)(1),
(2), (4) Date: Oct. 8, 2010

(87) PCT Pub. No.: WO2010/086933
PCT Pub. Date: Aug. 5, 2010

(65) Prior Publication Data
US 2011/0278273 A1    Nov. 17, 2011

(30) Foreign Application Priority Data

Jan. 28, 2009    (JP) .................................. 2009-016195

(51) Int. Cl.
*B23K 9/10*    (2006.01)
(52) U.S. Cl.
USPC ..................................................... 219/130.32
(58) Field of Classification Search
USPC ................. 219/130.1, 130.32, 130.33, 130.5, 219/130.51, 137 PS
See application file for complete search history.

(56) References Cited

U.S. PATENT DOCUMENTS

| | | | |
|---|---|---|---|
| 2005/0056630 A1 | 3/2005 | Tong | |
| 2005/0284854 A1* | 12/2005 | Tong et al. | ............... 219/130.51 |
| 2006/0102695 A1 | 5/2006 | Era et al. | |
| 2007/0246448 A1 | 10/2007 | Nishisaka et al. | |
| 2008/0314884 A1 | 12/2008 | Fujiwara et al. | |

FOREIGN PATENT DOCUMENTS

| | | |
|---|---|---|
| CN | 1593828 A | 3/2005 |
| CN | 1775444 A | 5/2006 |
| CN | 1803369 A | 7/2006 |
| CN | 101058124 A | 10/2007 |
| CN | 101151118 A | 3/2008 |
| EP | 1 681 123 A2 | 7/2006 |
| EP | 1 681 123 A3 | 6/2007 |
| EP | 1 681 123 B1 | 3/2013 |
| JP | 01-186279 A | 7/1989 |
| JP | 05-092269 A | 4/1993 |
| JP | 06-079457 A | 3/1994 |
| JP | 2003-088958 A | 3/2003 |
| JP | 2006-007239 A | 1/2006 |

OTHER PUBLICATIONS

International Search Report for Application No. PCT/JP2009/006300., Feb. 16, 2010, Panasonic Corporation.

* cited by examiner

*Primary Examiner* — Geoffrey S Evans
*Assistant Examiner* — Brandon Harvey
(74) *Attorney, Agent, or Firm* — RatnerPrestia

(57) ABSTRACT

An AC pulse arc welding method of the present invention sets an appropriate AC frequency based on a wire feed rate and a polarity ratio when the polarity ratio is changed without changing the wire feed rate to control a heat input to a base material, and sets an appropriate straight polarity current value necessary for one drop per pulse from the polarity ratio and the AC frequency in AC pulse welding. The method makes it possible to achieve appropriate AC pulse welding by setting the polarity ratio, and to easily set the welding conditions.

5 Claims, 3 Drawing Sheets

AC PULSE ARC WELDING METHOD

This Application is a U.S. National Phase Application of PCT International Application PCT/JP2009/006300.

TECHNICAL FIELD

The present invention relates to an alternating current (AC) pulse arc welding method that is a method of carrying out welding by feeding a wire as a consumable electrode to a base material as a workpiece to be welded, and supplying an electric current between the wire and the base material, thereby alternately repeating a reversed polarity period in which the wire is in positive polarity and a straight polarity period in which the wire is in negative polarity.

BACKGROUND ART

An AC pulse arc welding method is a method of carrying out welding by supplying a wire to a base material at a set wire feed rate, and alternately supplying a straight polarity current and a reversed polarity pulse current between the wire and the base material. Herein, the straight polarity current is a current that is allowed to flow so as to form globules at a tip of the wire by melting the wire during a straight polarity period in which the wire is in negative polarity. The reversed polarity pulse current is a current that is allowed to flow so as to transfer the globules at the tip of the wire to the base material by supplying a pulse current during a reversed polarity period in which the wire is in positive polarity. An example of known AC pulse arc welding method includes a method of setting a peak current energizing period and a peak current value in a reversed polarity period according to the conditions of a wire and a shield gas, and the like, in order to stabilize the arc. Another example is a method of uniformly setting an AC frequency and a straight polarity current value according to a wire feed rate (see, for example, Patent Document 1).

In a conventional AC pulse arc welding method, a straight polarity current value and a straight polarity period are uniformly determined according to a wire feed rate. Therefore, the energizing ratio in the reversed polarity period and the straight polarity period cannot be changed arbitrarily, so that it is not possible to make use of a merit of consumable electrode type AC pulse welding capable of controlling the welding penetration depth.

Furthermore, in order to cope with such problems, a welding apparatus capable of individually setting a polarity ratio, parameters such as a current in the reversed polarity period, and parameters such as a current in the straight polarity period may be possible. However, when the polarity ratio is changed in such a welding apparatus, in order to carry out appropriate welding, it is necessary to individually adjust parameters other than the polarity ratio. Thus, it takes a long time to find appropriate welding conditions.

[Patent Document 1] Japanese Patent Unexamined Publication No. H1-186279

SUMMARY OF THE INVENTION

The present invention solves the above-mentioned conventional problems by making it possible to carry out welding in which regular transfer of globules in the mode of one drop per pulse is achieved and occurrence of sputter is suppressed, and to arbitrarily change a polarity ratio, that is, a ratio of a straight polarity period to the total period of a reversed polarity period and the straight polarity period. Thus, the present invention provides an AC pulse arc welding method capable of adjusting a welding penetration depth by controlling heat input to a base material and easily setting welding conditions.

An AC pulse arc welding method of the present invention is a method for carrying out welding by alternately repeating a reversed polarity period and a straight polarity period, the reversed polarity period in which a reversed polarity current including a peak current and a base current is allowed to flow and a straight polarity period in which a straight polarity current is allowed to flow. The method includes: setting a wire feed rate; setting a polarity ratio that is a ratio of the straight polarity period to a total period of the reversed polarity period and the straight polarity period; and setting an AC frequency of AC pulse welding from the set wire feed rate and the set polarity ratio. When the polarity ratio is changed without changing the wire feed rate, the AC frequency is changed; and when a base current period in the reversed polarity period is changed, the AC frequency is changed.

This method avoids the change in the arc length caused by increase or decrease in the melting rate of the wire in the straight polarity period by increase or decrease in the polarity ratio. Thus, by changing the AC welding pulse frequency (hereinafter, referred to as "AC frequency"), an average amount of heat is changed, and the wire melting rate and the wire feed rate are balanced, thus keeping the arc length appropriate.

Thus, it is possible to achieve excellent welding capable of arbitrarily adjusting the heat input to the base material, that is, the welding penetration depth by increasing or decreasing the polarity ratio.

DETAILED DESCRIPTION OF THE PREFERRED EMBODIMENT

Figure 1:
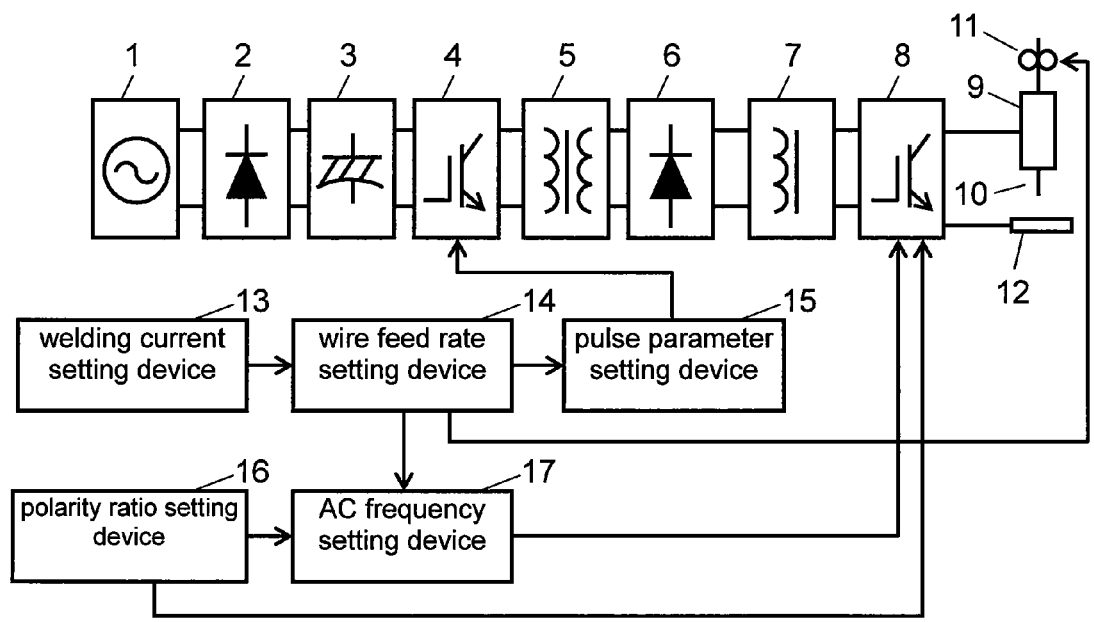
FIG. 1 is a diagram showing a schematic configuration of a welding apparatus in accordance with a first exemplary embodiment of the present invention.

Hereinafter, exemplary embodiments of the present invention are described with reference to drawings. In the following drawings, the same reference numerals are given to the same elements and the description thereof may be omitted. Note here that the present invention is not limited to the exemplary embodiments.

First Exemplary Embodiment

Figure 2:
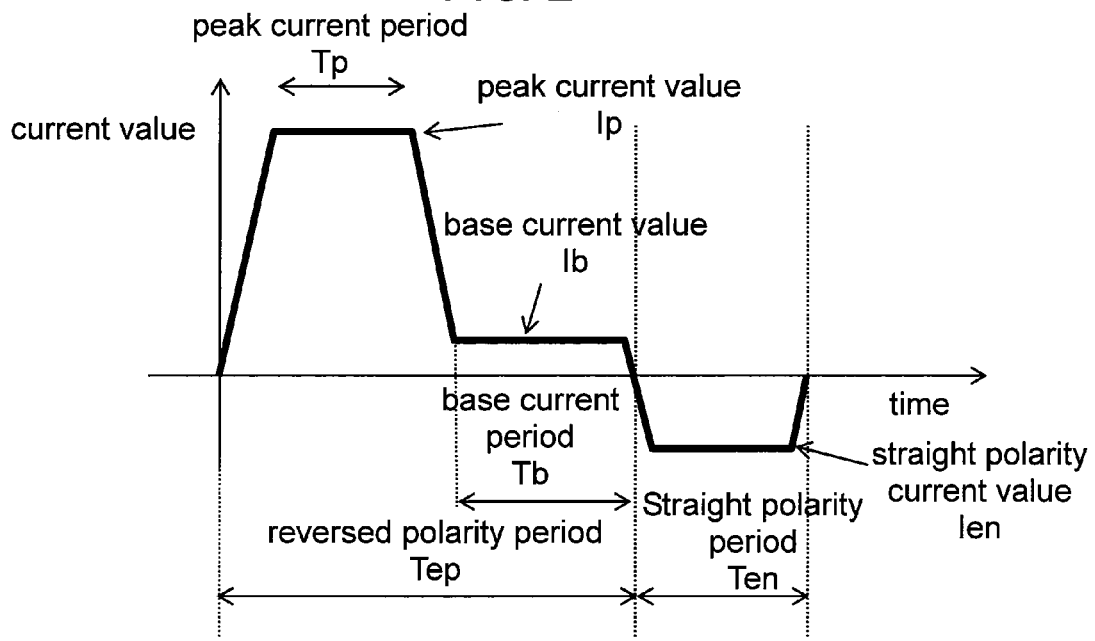
FIG. 2 is a graph showing an example of an AC pulse waveform in accordance with the first exemplary embodiment of the present invention.
Figure 3:
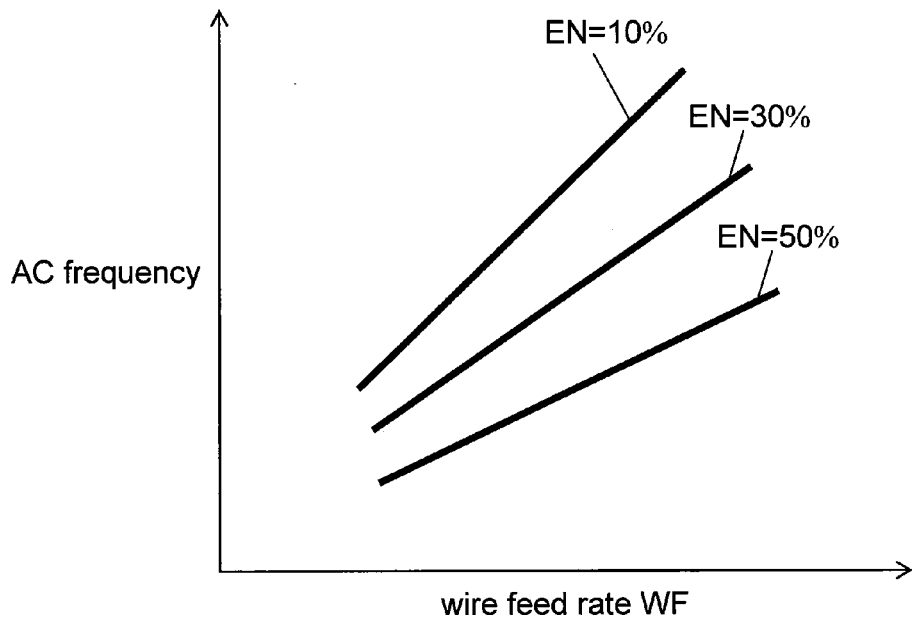
FIG. 3 is a graph showing a relation between a wire feed rate and AC frequency in which a polarity ratio is used as a parameter in accordance with the first exemplary embodiment of the present invention.

FIG. 1 is a diagram showing a schematic configuration of a welding apparatus in accordance with a first exemplary embodiment of the present invention. FIG. 2 is a graph showing an example of an AC pulse waveform in accordance with the first exemplary embodiment of the present invention. FIG. 3 is a graph showing a relation between a wire feed rate and an AC frequency in which a polarity ratio is used as a parameter in accordance with the first exemplary embodiment of the present invention.

In the welding apparatus shown in FIG. 1, an electric power from three-phase AC power supply 1 is full-wave rectified by primary rectifier 2 and smoothed by smoothing capacitor 3 into a DC voltage. Primary inverter circuit 4 receives an input of the smoothed DC voltage, generates an alternating current by switching operation, and outputs it to the primary side of welding transformer 5. Welding transformer 5 outputs the AC output to secondary rectifier 6 connected to the secondary side of welding transformer 5. Secondary rectifier 6 receives the output from welding transformer 5, and full-wave rectifies the output. The output from secondary rectifier 6 is a DC output in which current ripples are suppressed by DC reactor 7. The DC output of DC reactor 7 is converted into an AC output necessary for AC pulse welding by secondary inverter circuit 8. Secondary inverter circuit 8 outputs a positive side output to wire 10 and outputs a negative side output to base material 12. Thus, AC pulse arc welding is carried out.

Next, a setting of a welding output in a welding apparatus in accordance with this exemplary embodiment is described. When a user of the welding apparatus operates welding current setting device 13 to set a welding current having a predetermined magnitude, a wire feed rate corresponding to the magnitude of the set welding current is uniformly set by wire feed rate setting device 14. Wire feed rate setting device 14 stores a plurality of combinations of the magnitude of the welding current and the wire feed rate, and determines the wire feed rate based on the magnitude of the welding current. Then, wire feeding motor 11 is driven based on a signal from wire feed rate setting device 14, and thereby wire 10 held by welding torch 9 is fed at a constant speed toward base material 12 at a set wire feed rate.

The wire feed rate is set based on the magnitude of the set welding current. Various pulse parameters constituting an AC pulse waveform are uniformly set based on the wire feed rate. Herein, as shown in FIG. 2, the pulse parameters include peak current value Ip, base current value Ib, and peak current period Tp in reversed polarity period Tep, straight polarity period Ten, and straight polarity current value Ien in straight polarity period Ten, and the like.

These various pulse parameters are stored in pulse parameter setting device 15 as a table such that they correspond to the wire feed rate. The various pulse parameters are selected by pulse parameter setting device 15 based on the set wire feed rate, and are output to primary inverter circuit 4. Then, primary inverter circuit 4 is controlled so that the welding output matches various pulse parameters. Thus, a welding output necessary for an AC pulse arc welding can be obtained. Note here that FIG. 2 shows an example of an AC pulse waveform including various pulse parameters.

A user of the welding apparatus operates polarity ratio setting device 16 to set a polarity ratio. An AC frequency of AC welding is uniformly determined and set by AC frequency setting device 17 based on the set polarity ratio and the set wire feed rate. Note here that the setting of the AC frequency is carried out by AC frequency setting device 17 that previously stores a calculation formula relating to the AC frequency determined from the wire feed rate and the polarity ratio, and calculates the AC frequency from the formula based on the set wire feed rate and the set polarity ratio.

FIG. 3 shows a relation among an AC frequency, a wire feed rate, and a polarity ratio. As shown in FIG. 3 in which the polarity ratio is used as a parameter, it is experimentally shown that the AC frequency tends to linearly increase with respect to the wire feed rate. Furthermore, as a polarity ratio, i.e., a straight polarity ratio (hereinafter, referred to as "EN ratio") increases, the AC frequency tends to decrease. Based on the relation, a formula for calculating an AC frequency is determined from the wire feed rate and the EN ratio. Note here that by allowing AC frequency setting device 17 to store a table, instead of the calculation formula, which includes a plurality of combinations of a wire feed rate, an EN ratio and an AC frequency, the AC frequency may be determined based on the wire feed rate and the EN ratio.

Then, the EN ratio and the AC frequency are output to secondary inverter circuit 8 and secondary inverter circuit 8 is operated, and thereby a welding output applied between wire 10 and base material 12 is controlled to be the set AC pulse waveform.

Note here that when the EN ratio is changed Without changing the wire feed rate, the AC frequency is changed. However, peak current value Ip, base current value Ib, and peak current period Tp in the reversed polarity period, straight polarity period Ten, and straight polarity current value Ien in straight polarity period Ten in the AC pulse waveform corresponding to the wire feed rate shown in FIG. 2 are not changed. The AC frequency is changed by increasing or decreasing base current period Tb that is a period in which the base current flows in reversed polarity period Tep according to the change of the EN ratio.

Herein, it is generally known that in a consumable electrode type AC pulse arc welding by using wire 10, a cold cathode is used and the thermal transport is dominated by positive ions. Heat input is increased at the cathode side. In the case of the consumable electrode type AC pulse arc welding of the first exemplary embodiment, since base material 12 is a cathode side in the reversed polarity period, the heat input to base material 12 is increased. On the other hand, since wire 10 is a cathode side in the straight polarity period, the heat input to wire 10 is increased.

Thus, when the EN ratio is changed without changing the wire feed rate, the wire feed rate is constant regardless of the EN ratio. Therefore, when the EN ratio is made to be higher, the heat input to base material 12 is decreased but an amount of heat input to wire 10 is increased. As a result, the melting rate of wire 10 is increased, and as a welding phenomenon, wire 10 fires and the arc length is increased. In this case, by reducing the AC frequency so as to reduce the average heat amount per unit time, the wire melting rate is reduced. This makes it possible to balance between the wire feed rate and the wire melting rate and to achieve an appropriate arc length.

On the other hand, when the EN ratio is made to be lower and the reversed polarity ratio (hereinafter, referred to as "EP ratio" (=1-(EN ratio))) is made to be higher, the heat input to base material 12 is increased but an amount heat input to wire 10 is reduced. Therefore, the melting rate of wire 10 is reduced, and the arc length is shortened. As a welding phenomenon, wire 10 enters into base material 12, thus increasing the short circuit. In this case, by increasing the AC frequency so as to increase the average heat amount per unit time, the wire melting rate is increased. This makes it possible to balance between the wire feed rate and the wire melting rate and to achieve an appropriate arc length.

As mentioned above, the AC frequency is determined by AC frequency setting device 17 based on the set wire feed rate and the set EN ratio.

As mentioned above, by increasing or decreasing the EN ratio in order to adjust the welding penetration of base material 12, the change in the arc length caused by the increase or decrease of the wire melting rate in the straight polarity period can be avoided. Thus, by changing the AC frequency of the AC welding according to the EN ratio, an average amount of heat to be given to wire 10 is changed. Thus, the AC pulse arc welding method of the first exemplary embodiment can keep the arc length appropriate by balancing between the wire melting rate and the wire feed rate.

Therefore, it is possible to achieve excellent welding capable of arbitrarily adjusting the heat input to the base material, that is, the welding penetration depth by increasing or decreasing the EN ratio.

Furthermore, according to the AC pulse arc welding method of the first exemplary embodiment, when an EN ratio is changed, an AC frequency is automatically set. Furthermore, even when the EN ratio is changed without changing the wire feed rate, a peak current value, a base current value, and a peak current period in the reversed polarity period, a straight polarity period, and a straight polarity current in the straight polarity period are not changed.

Therefore, when the EN ratio is changed, an operator of the welding apparatus needs not individually adjust parameters other than the EN ratio. Thus, appropriate welding conditions can be set easily.

That is to say, the AC pulse arc welding method of the first exemplary embodiment carries out welding by alternately repeating a reversed polarity period and a straight polarity period, the reversed polarity period in which a reversed polarity current including a peak current and a base current is allowed to flow, and the straight polarity period in which a straight polarity current is allowed to flow. The AC pulse arc welding method includes a step of setting a wire feed rate, a step of setting a polarity ratio, a step of setting an AC frequency of an AC pulse welding, and a step of welding by changing the AC frequency. In the AC pulse arc welding method, when the polarity ratio is changed without changing the wire feed rate, the AC frequency is changed, and the AC frequency is changed by changing the base current period in the reversed polarity period. Herein, the step of setting the polarity ratio sets the ratio of the straight polarity period to the total period of the reversed polarity period and the straight polarity period. Furthermore, the step of setting the AC frequency sets the AC frequency of AC pulse welding based on the set wire feed rate and the set polarity ratio.

According to this method, the change in the arc length caused by increase or decrease in the melting rate of the wire in the straight polarity period is avoided. Thus, by changing an AC frequency so as to change the average amount of heat, it is possible to balance between the wire melting rate and the wire feed rate and to keep the arc length appropriate.

Furthermore, the AC pulse arc welding method of the present invention may be a method of carrying out welding, which further includes a step of setting a straight polarity current value in a straight polarity period from the set polarity ratio and the set AC frequency. In the method, when the polarity ratio is changed without changing the wire feed rate, the AC frequency and the straight polarity current value are changed.

The method can achieve excellent welding capable of arbitrarily adjusting the heat input to the base material, that is, the welding penetration depth by increasing or decreasing the polarity ratio.

Furthermore, the AC pulse arc welding method of the present invention may be a method of carrying out welding in which when the polarity ratio is changed without changing the wire feed rate, an AC frequency and a straight polarity current value are changed without changing a peak current period, a peak current value, and a base current value in a reversed polarity period and a straight polarity period.

The method can achieve excellent welding capable of arbitrarily adjusting the heat input to the base material, that is, the welding penetration depth by increasing or decreasing the polarity ratio. Furthermore, in addition to the adjustment of the AC frequency, it is possible to set a straight polarity current necessary to regularly carry out one drop welding in which one drop of globules is separated in one pulse. This makes it possible to achieve excellent welding capable of stabilizing the arc length and thus obtaining a fine bead in which the occurrence of sputter is suppressed.

Furthermore, the method of carrying out welding by changing an AC frequency to change a base current period in the reversed polarity period may be employed.

The method can achieve excellent welding capable of arbitrarily adjusting the heat input to the base material, that is, the welding penetration depth by increasing or decreasing the polarity ratio.

Second Exemplary Embodiment

Figure 4:
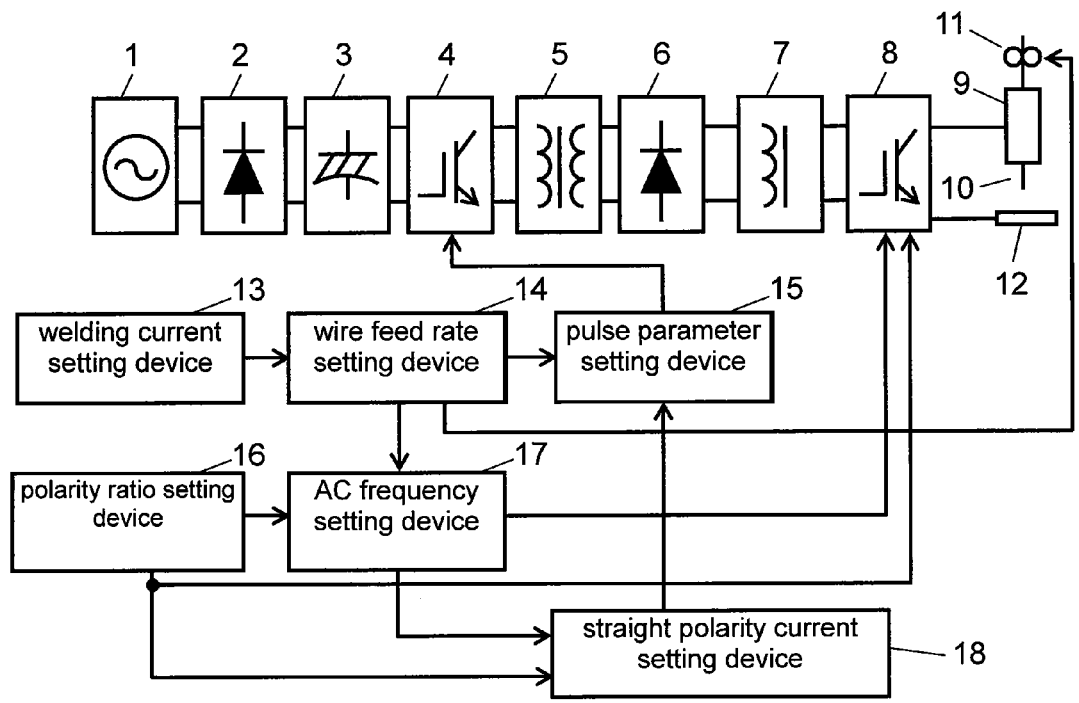
FIG. 4 is a diagram showing a schematic configuration of a welding apparatus in accordance with a second exemplary embodiment of the present invention.
Figure 5:
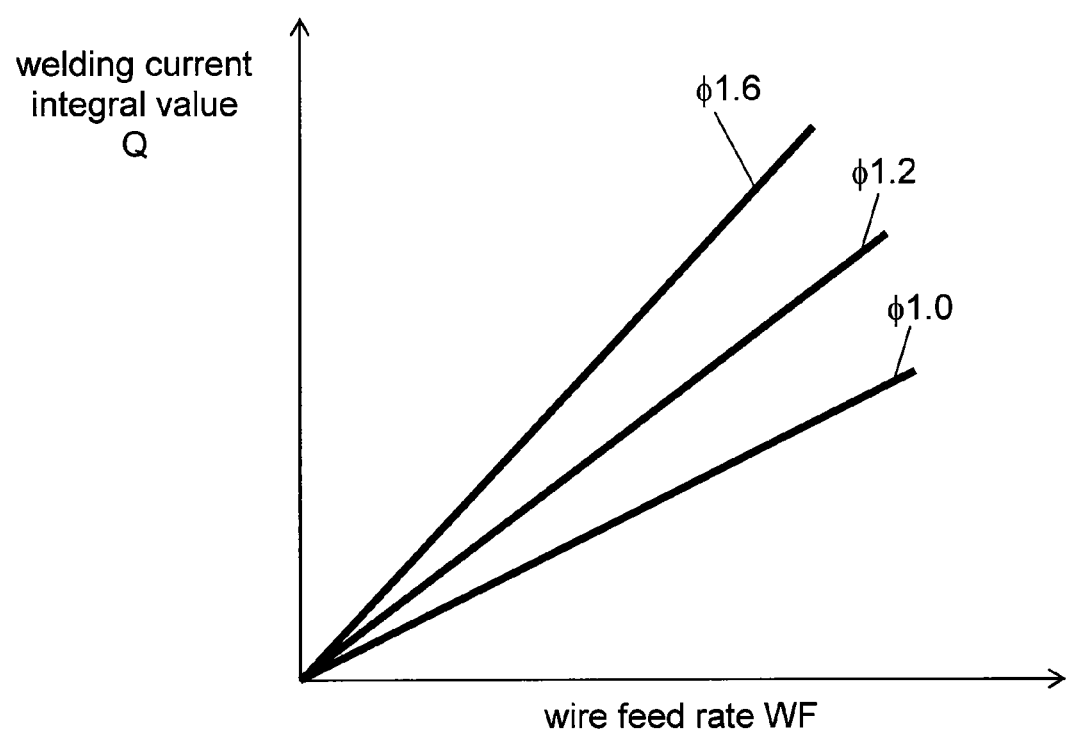
FIG. 5 is a graph showing a relation between a wire feed rate and a welding current integral value in accordance with the second exemplary embodiment of the present invention.

FIG. 4 is a diagram showing a schematic configuration of a welding apparatus in accordance with a second exemplary embodiment of the present invention. FIG. 5 is a graph showing a relation between a wire feed rate and a welding current integral value in accordance with the second exemplary embodiment of the present invention.

The welding apparatus shown in FIG. 4 is different from the welding apparatus described with reference to FIG. 1 in the first exemplary embodiment mainly in that straight polarity current setting device 18 is provided and a straight polarity current value in a straight polarity period is changed according to an EN ratio.

Hereinafter, setting of a welding output in the second exemplary embodiment is described. The difference from the first exemplary embodiment is mainly described.

Similar to the first exemplary embodiment, also in this the second exemplary embodiment, when an AC frequency is changed according to the EN ratio, an arc length is kept substantially constant.

However, since the AC frequency is changed by increasing or decreasing base current period Tb in reversed polarity period Tep shown in FIG. 2, reversed polarity period Tep is increased or decreased by changing the EN ratio. Furthermore, since an amount of heat that can be applied to wire 10 in one pulse is increased or decreased, appropriate and regular separation of globules from wire 10 in the mode of one drop per pulse may not be secured.

In this way, when the AC frequency is controlled, although the arc length can be kept constant in macro, heat input to wire 10 may be excessive or insufficient depending upon welding conditions. Therefore, an ideal separation in the mode of one drop per pulse cannot be achieved, and one drop in multiple pulses or sputter may occur, which may cause a phenomenon of large short-circuit that should not occur in pulse welding. As a result, arc may be unstable, irregularity at the edge around a welding bead or generation of smut (aluminum oxide), and the like, may occur.

Therefore, it is necessary to adjust an amount of heat so that an amount of heat necessary for one pulse can be applied to wire 10. Then, by adjusting a straight polarity current value so that an amount of heat is appropriate for one drop per pulse, it is possible to optimize a preheating effect to wire 10 for being separated when the subsequent pulse is applied.

In the second exemplary embodiment, the EN ratio set by polarity ratio setting device 16 and the AC frequency set by AC frequency setting device 17 are input into straight polarity current setting device 18, and straight polarity current setting device 18 determines and sets an appropriate straight polarity current value (Ien). Then, straight polarity current value (Ien)

set by straight polarity current setting device 18 is input into pulse parameter setting device 15, and control necessary for an AC output is carried out by primary inverter circuit 4.

Note here that straight polarity current value (Ien) is determined as follows. The below-mentioned calculation formula representing the relation of the EN ratio, the AC frequency and straight polarity current value (Ien) is previously stored in straight polarity current setting device 18. From the set EN ratio and the set AC frequency, straight polarity current value (Ien) is calculated and set. Note here that by allowing straight polarity current setting device 18 to store a table, instead of calculation formula, which includes a plurality of combinations of the EN ratio, the AC frequency and straight polarity current value (Ien), straight polarity current value (Ien) may be determined based on the EN ratio and the AC frequency.

Next, setting of straight polarity current value (Ien) is described. When a straight polarity ratio, that is, an EN ratio is increased by polarity ratio setting device 16, an AC frequency is decreased in AC frequency setting device 17. Welding current integral value Q in the straight polarity period is increased. Thus, in order to achieve one drop per pulse, it is necessary to reduce a molten amount of wire 10. Straight polarity current setting device 18 selects and sets straight polarity current value (Ien) that is reduced as compared with before the EN ratio is increased.

On the other hand, when the EN ratio is decreased by polarity ratio setting device 16, the AC frequency is increased in AC frequency setting device 17. Therefore, welding current integral value Q in the straight polarity period is decreased. Thus, in order to achieve one drop per pulse, it is necessary to increase a molten amount. Straight polarity current setting device 18 selects and sets straight polarity current value (Ien) that is increased as compared with before the EN ratio is decreased.

In this way, when the EN ratio is increased, the straight polarity current is decreased as compared with before the increase. When the EN ratio is decreased, the straight polarity current is increased as compared with before the decrease. Thus, even when the EN ratio is changed, an appropriate arc length can be maintained, and appropriate and regular separation of globules in a mode of one drop per pulse can be achieved.

Next, calculation of straight polarity current value (Ien) is described. It is experimentally found that welding current integral value Q, which is an amount of heat per second to melt wire 10 and keep the arc length constant, and wire feed rate WF have a linearly increasing relation as shown in FIG. 5.

Welding current integral value Q can be represented by the following mathematical formula Math.1.

[Math. 1]

$$Q = (\Sigma Iep + \alpha \Sigma Ien) \times f \quad (1)$$

Tep Ten

In the mathematical formula Math.1, Q denotes a welding current integral value per second. This is a value obtained by multiplying the sum of a welding current integral value in reversed polarity period (Tep) and a welding current integral value in straight polarity period (Ten) by a frequency. Herein, f denotes an AC frequency.

Note here that as shown also in the first exemplary embodiment, it is generally known that in a consumable electrode type AC pulse arc welding by using wire 10, a cold cathode is used and the thermal transport is dominated by positive ions. Accordingly, the heat input is increased at the cathode side. Therefore, in the consumable electrode type AC pulse arc welding in accordance with the second exemplary embodiment, since base material 12 is a cathode side in the reversed polarity period, the heat input to base material 12 is increased. On the other hand, since wire 10 is a cathode side in the straight polarity period, the heat input to wire 10 is increased.

In this way, it is known that the heat input to the wire in the straight polarity period is higher than the heat input to the wire in the reversed polarity period. Therefore, Q is calculated by multiplying the current integral value in straight polarity period (Ten) by coefficient $\alpha$. Herein, it is preferable that $\alpha$ is a coefficient that substantially satisfies the relation: $1 < \alpha < 10$ in consideration of materials and diameters of wire 10.

When a user of the welding apparatus operates welding current setting device 13 to set a welding current, a wire feed rate corresponding to the set welding current is uniformly set by wire feed rate setting device 14.

Based on the wire feed rate that is set based on the set welding current, various pulse parameters constituting the AC waveform, for example, a peak current value, a base current value, and a peak current period in the reversed polarity period, a straight polarity period, and the like, can be uniformly set. These various pulse parameters are stored as a table in pulse parameter setting device 15 such that they correspond to the wire feed rate. The various parameters are selected by pulse parameter setting device 15 based on the set wire feed rate.

Furthermore, when a user of the welding apparatus operates polarity ratio setting device 16, an EN ratio is set. Also in the second exemplary embodiment similar to the first exemplary embodiment, an AC frequency of the AC welding is uniformly determined and set by AC frequency setting device 17 from the set EN ratio and the set wire feed rate.

Then, a straight polarity current value in the straight polarity period can be calculated from the above-mentioned various pulse parameters and the AC frequency based on the mathematical formula Math. 1.

More specifically, heat amount Q1 necessary for one cycle of AC pulse waveform can be calculated by dividing welding current integral value Q by the AC frequency. Heat amount Qep in the reversed polarity period, which can be obtained from a peak current value, a base current value, a peak current period, and a base current period in the reversed polarity period, is subtracted from heat amount Q1. Thus, heat amount Qen in the straight polarity period can be obtained. Then, by dividing heat amount Qen by coefficient $\alpha$ and further by the straight polarity period, the straight polarity current value can be obtained.

The above-mentioned calculation is carried out in straight polarity current setting device 18 according to the above-mentioned procedures.

As mentioned above, according to the second exemplary embodiment, when the EN ratio is changed without changing the wire feed rate, the pulse parameters such as a peak current value, a base current value, and a peak current period in the reversed polarity period, and a straight polarity period are not changed. However, an AC frequency and a straight polarity current are changed according to the EN ratio.

Thus, also in the second exemplary embodiment, the same effect as in the first exemplary embodiment can be achieved. Furthermore, since the straight polarity current is changed according to the change of the EN ratio, an appropriate arc length can be maintained and regular separation of globules in a mode of one drop per pulse can be achieved. Thus, excellent welding results can be obtained.

Note here that as shown in FIG. 5, it is experimentally found that welding current integral value Q and the wire feed rate have a linearly increasing relation. Furthermore, this shows an example of alternating pulse MIG welding method using aluminum. In this case, it is confirmed that the larger the wire diameter is, the larger welding current integral value Q is; and the smaller the wire diameter is, the smaller welding current integral value Q is.

Specifically, as shown in FIG. 5, it is experimentally confirmed that when the wire feed rates are the same, welding current integral value Q is larger in a wire having a wire diameter of ϕ1.6 mm than in a wire having a wire diameter of ϕ1.2 mm, and that on the contrary, welding current integral value Q is smaller in a wire having a wire diameter of ϕ1.0 mm than in a wire having a wire diameter of ϕ1.2 mm.

That is to say, when the EN ratio is changed without changing the wire feed rate, the AC pulse arc welding method of the present invention may decrease the AC frequency in the case where the EN ratio is increased and the ratio of the straight polarity period to a total period of the reversed polarity period and the straight polarity period is increased as compared with before the change, and increase the AC frequency in the case where the EN ratio is reduced and the ratio of the straight polarity period to a total period of the reversed polarity period and the straight polarity period is reduced as compared with before the change.

With this method, the AC frequency and the straight polarity current of AC welding are uniformly obtained according to the change of the EN ratio, and the pulse parameters can be automatically set. Therefore, this method can achieve a welding method capable of easily setting the welding conditions.

Furthermore, when the EN ratio is changed without changing the wire feed rate, the AC pulse arc welding method of the present invention may decrease the straight polarity current value in the case where the EN ratio is increased and the ratio of the straight polarity period to a total period of the reversed polarity period and the straight polarity period is increased as compared with before the change, and increase the straight polarity current value in the case where the EN ratio is reduced and the ratio of the straight polarity period to a total period of the reversed polarity period and the straight polarity period is reduced as compared with before the change.

With this method, the AC frequency and the straight polarity current of AC welding are uniformly obtained according to the change of the EN ratio, and the pulse parameters can be automatically set. Therefore, this method can achieve a welding method capable of easily setting the welding conditions.

Furthermore, the AC pulse arc welding method of the present invention may include a step of setting a heat amount, a step of calculating an appropriate current integral value, a step of calculating a current integral value necessary for a straight polarity period, and a step of determining a straight polarity current value. Herein, the step of setting a heat amount sets an amount of heat for melting a wire and making the arc length constant based on the set wire feed rate. The step of calculating an appropriate current integral value calculates an appropriate current integral value that is a heat amount necessary for one cycle of current waveform of the AC welding by dividing the heat amount by the set AC frequency. The step of calculating a current integral value necessary for the straight polarity period calculates the current integral value necessary for the straight polarity period by subtracting the welding current integral value in the reversed polarity period from the appropriate integral value of an electric current. The step of determining a straight polarity current value determines the straight polarity current value from the current integral value necessary for the straight polarity period and the straight polarity period.

With this method, the frequency and the straight polarity current of AC welding can be uniformly obtained according to the change of the EN ratio, and the pulse parameters can be automatically set. Therefore, it is possible to achieve the welding method capable of easily setting the welding conditions.

Furthermore, when a welding current is set, a wire feed rate that is determined corresponding to the welding current is set. The EN ratio is changed without changing the wire feed rate. Accordingly, the wire feed rate is constant regardless of the EN ratio. Therefore, since an amount of metal to be welded does not change and the welding conditions can be set easily, a time for deriving appropriate welding conditions can be shortened.

INDUSTRIAL APPLICABILITY

An AC pulse arc welding method of the present invention changes an AC frequency, thereby changing an average amount of heat in order to avoid a change in an arc length caused by increase or decrease of a melting rate of a wire in a straight polarity period due to increase or decrease in a polarity ratio. Thus, since it is possible to balance between the wire feed rate and the wire melting rate so as to keep the arc length appropriate, the method is industrially useful as a method of welding, for example, aluminum.

REFERENCE MARKS IN THE DRAWINGS

1 three-phase AC power supply
2 primary rectifier
3 smoothing capacitor
4 primary inverter circuit
5 welding transformer
6 secondary rectifier
7 DC reactor
8 secondary inverter circuit
9 welding torch
10 wire
11 wire feeding motor
12 base material
13 welding current setting device
14 wire feed rate setting device
15 pulse parameter setting device
16 polarity ratio setting device
17 AC frequency setting device
18 straight polarity current setting device

The invention claimed is:

1. An AC pulse arc welding method for carrying out welding by alternately repeating a reversed polarity period and a straight polarity period, the reversed polarity period in which a reversed polarity current including a peak current and a base current is allowed to flow, and the straight polarity period in which a straight polarity current is allowed to flow, the method comprising:

setting a wire feed rate;
setting a polarity ratio that is a ratio of the straight polarity period to a total period of the reversed polarity period and the straight polarity period;
setting an AC frequency of AC pulse welding from the set wire feed rate and the set polarity ratio;
setting a straight polarity current value in the straight polarity period from the set polarity ratio and the set AC frequency;
setting an amount of heat for melting a wire and making an arc length constant based on the set wire feed rate;
calculating an appropriate current integral value that is an amount of heat necessary for one cycle of an electric current waveform of AC welding by dividing the amount of heat by the set AC frequency;

calculating a current integral value necessary for the straight polarity period by subtracting a welding current integral value in the reversed polarity period from the appropriate current integral value; and determining the straight polarity current value from the straight polarity period and the current integral value necessary for the straight polarity period, wherein, welding by changing the AC frequency when the polarity ratio is changed without changing the wire feed rate, by changing a base current period in the reversed polarity period, when the polarity ratio is changed without changing the wire feed rate, the AC frequency and the straight polarity current value are changed, thereby carrying out welding.

2. The AC pulse arc welding method of claim 1, wherein when the polarity ratio is changed without changing the wire feed rate, the AC frequency and the straight polarity current value are changed without changing a peak current period, a peak current value and a base current value in the reversed polarity period, and the straight polarity period, thereby carrying out welding.

3. The AC pulse arc welding method of claim 1, wherein when the polarity ratio is changed without changing the wire feed rate, the AC frequency is reduced when the polarity ratio becomes larger than before the change, and the AC frequency is increased when the polarity ratio becomes smaller than before the change, thereby carrying out welding.

4. The AC pulse arc welding method of claim 1, wherein when the polarity ratio is changed without changing the wire feed rate, the straight polarity current value is reduced when the polarity ratio becomes larger than before the change, and the straight polarity current value is increased when the polarity ratio becomes smaller than before the change, thereby carrying out welding.

5. The AC pulse arc welding method of claim 2, wherein when the polarity ratio is changed without changing the wire feed rate, the straight polarity current value is reduced when the polarity ratio becomes larger than before the change, and the straight polarity current value is increased when the polarity ratio becomes smaller than before the change, thereby carrying out welding.

* * * * *